(12) United States Patent  (10) Patent No.: US 7,288,032 B2
Chabala  (45) Date of Patent: Oct. 30, 2007

(54) PUTTING TRAINING DEVICE

(76) Inventor: Dennis B. Chabala, 1111 Cabrillo Park Dr., Santa Ana, CA (US) 92701-4420

( * ) Notice: Subject to any disclaimer, the term of this patent is extended or adjusted under 35 U.S.C. 154(b) by 74 days.

(21) Appl. No.: 11/040,420

(22) Filed: Jan. 21, 2005

(65) Prior Publication Data

US 2006/0166766 A1  Jul. 27, 2006

(51) Int. Cl.
 *A63B 57/00* (2006.01)
(52) U.S. Cl. .................................... 473/404
(58) Field of Classification Search ............... 473/404; 33/377, 381, 389, 390
See application file for complete search history.

(56) References Cited

U.S. PATENT DOCUMENTS

| 438,541 | A |  | 10/1890 | Green |  |
|---|---|---|---|---|---|
| 759,628 | A |  | 4/1904 | Happle |  |
| 824,109 | A | * | 6/1906 | Gibson | 33/389 |
| 1,233,756 | A |  | 7/1917 | Cox |  |
| 1,255,744 | A |  | 2/1918 | Hench |  |
| 1,630,172 | A |  | 5/1927 | Custer |  |
| 1,898,162 | A |  | 2/1933 | Bair |  |
| 2,836,900 | A |  | 6/1958 | Vogt |  |
| D195,431 | S |  | 6/1963 | Rieker, Jr. |  |
| 3,245,150 | A |  | 4/1966 | Roe et al. |  |
| 3,531,808 | A |  | 10/1970 | McCue |  |
| 3,568,325 | A | * | 3/1971 | Baltz | 33/281 |
| 3,673,696 | A |  | 7/1972 | Wasson |  |
| 3,751,819 | A | * | 8/1973 | Dixon | 33/389 |
| 5,330,179 | A | * | 7/1994 | Hampel | 473/404 |
| 5,492,322 | A | * | 2/1996 | Smith | 473/404 |
| 5,755,623 | A | * | 5/1998 | Mizenko | 473/241 |
| 5,792,015 | A | * | 8/1998 | Hoyt et al. | 473/404 |
| 6,386,994 | B1 |  | 5/2002 | H'Doubler et al. |  |
| 2006/0073916 | A1 | * | 4/2006 | Lin | 473/404 |

FOREIGN PATENT DOCUMENTS

JP  57053601  3/1982

* cited by examiner

*Primary Examiner*—Steven Wong
(74) *Attorney, Agent, or Firm*—Fish & Associates, PC (57) ABSTRACT

A golf putting training device that indicates the proper aim point on sloped putting surfaces such as golf course greens and compensates for the slope of the various putting surfaces. The device comprises a platform supporting one or more spirit levels. The device can be elevated upon the putting green surface to permit a golf ball to roll underneath the device when the ball is putted towards the indicated aim point; or not elevated when aim points are referenced to the golf cup or hole.

9 Claims, 4 Drawing Sheets

PUTTING TRAINING DEVICE

FIELD OF THE INVENTION

The invention relates to a training device for improving the golf putting, more particularly to a device that reads the slope of a selected part of the putting green, and that can optionally indicate a putting path between the ball and the putting hole which takes into account the slope of the green between the ball and the hole.

BACKGROUND OF THE INVENTION

Golf is enjoyed by people of all ages throughout the world. It is played and enjoyed by both athletic types and non-athletic types of people. It is one of the few athletic activities that can be played and enjoyed by people with handicaps, such as a missing limb, a bad back, sight problems, and the like. The game is very challenging and requires mental concentration as well as athletic ability. Fortunately it does not require the athletic ability of a good or better athlete to play a decent round of golf. Through lessons and practice almost anyone can learn to play to a level that makes the game enjoyable and challenging. One of the greatest aspects of golf is that the golfer is playing against him or her self. A good golfer concentrates on his or her game, not the game or score of others he or she is playing with or against. This is a lesson that all great golf pros know.

There are typically four aspects to the game: the driving, the short game, getting out of trouble, and putting. Each aspect has its own challenges and requires practice to master, if ever mastered.

Putting appears deceptively simple. It seems like anybody could grab a putter, i.e., the putting golf club, and putt or hit the golf ball to have the ball roll to the cup or hole and roll in it. Unfortunately putting is not simple and requires practice, more practice and even more practice. There is an old golf adage: golfers drive for show and putt for money. Great golf pros are great putters. They know the speed or condition of the putting green surface and their caddie, a professional just as much as the pro golfer, has read and recorded the green slope[s] from many different directions. This information is imparted to the pro by the caddie. It is very common to see the golf pro conferring with his or her caddie when the pro has to putt. The caddie frequently refers to a notebook that they prepare prior to the tournament regarding their readings of the putting green. These readings refer to the slope of the green surface or grass and the slope[s] of the green between the golf ball and the cup or hole.

Most golfers cannot afford a full time caddie who reads the course for them before they begin a round of golf or who is familiar with the course from caddying on and playing on the course. At those golf courses and clubs that still make available experienced caddies, the golfer can learn about a putting green from the experienced caddie during a round of golf.

There are three conditions that must be taken into account when putting: (1) the rolling speed of the golf ball on the putting surface, (2) the slope[s] of the putting surface between the golf ball and the hole, and (3) the condition of the putting surface, such as, type and condition of the surface. For purposes of this patent, a course means a golf course or any practice facility, a ball means a golf ball, a putting surface means the putting green or practice surface, a cup or hole means the hole in the green which the golfer is attempting to get his or her ball into, a putter is the golf club that the golfer uses to hit a ball on the green in an attempt to roll the ball to and into the cup or hole, 'to putt' or 'putting' or 'putt' means to hit the ball on the green with the putter in an attempt to have the ball roll to and into the cup or hole, and 'to sink a putt' or 'sinking a putt' means to putt the ball and to successfully have the ball roll to and in the cup or hole. The direct putting path is the line of sight straight line between the hole and the ball. As most golfers know, a putt attempted along the direct putting path will in most instances, except for short putts, miss the hole for reasons set forth below. A short putt is normally a putt made three feet or less from the cup. The slope means a portion of the surface of a green that deviates from being parallel to the true level, true horizon or true level of the Earth (collectively "true level" herein). As used herein, putting green means putting surface. Most putting surfaces are closely cropped grass. However, synthetic putting surfaces, such as Astroturf® synthetic turf, packed oiled sand surfaces, dead grass surfaces, rug surfaces, exist.

A spirit level is used to determine when an object, normally a surface of the object is parallel to true level or perpendicular to it. Some spirit levels are the arc of a circle and have a scale to give readings, in degrees, of the slope of the object to true level. To take, or to determine, or to measure a slope means to determine the angle of the surface of the green to the true horizon or true level of the Earth. The angle can be measure in degrees or it can be measured as an aiming point for the indicated putting path. Some slopes or breaks are perpendicular to the direct putting path; however most slopes or breaks intersect the direct putting path at angles other than 90 degrees. The actual putting path is the line, normally curved, between the ball and hole that will sink a putt when the ball is correctly hit or putted. The indicated putting path is the putting path indicated by the training device of the present invention. When the ball is properly putted, it will track the indicated putting path to sink a putt. The indicated putting path is determined by the measured slope and is the line of sight straight line between the ball and an aiming point on the training device.

A golfer putts to the aiming point and because of the slope of the green and gravity the ball will normally roll along a curved path, the actual putting path. Because of the slope, the face of the putter must be square or perpendicular to the indicated putting path and gravity, the ball rolling along the indicated putting path will curve into the actual putting path which may have the ball curve away from the aiming point before the ball reaches the aiming point. No putt can be made if the golfer does not correctly hit the ball, i.e. impart the right amount of energy to the ball to roll to the cup, and address the putter face squarely to the aim point so the ball rolls, at least initially, towards the aiming point. The indicated putting path is normally a curved path between the ball and cup. To correctly putt, the face of the putter at impact must be square, i.e. perpendicular to the straight line intersecting the ball and the aim point In most courses the hole is changed daily before the course is open to the public. In most courses the speed of each green, i.e. stimp rating, is taken daily and the stimp readings are available at the golf shop or pro shop. Where weather conditions can change dramatically during the course of the day, e.g. dewy or misty mornings and hot dry afternoons, the stimp readings may be taken two or three times a day. To successfully putt, a golfer must learn to adjust their putting or hitting of the golf ball to accommodate different green conditions which are indicative of different stimp readings. Every golfer has putted a ball to hard for the green conditions (a fast green-normally quiet dry) and has had the ball fly off the green and similarly every golfer has putted a ball too softly for the green conditions (a slow green-normally wet or moist grass, or dew) and had ball roll to only half as far as he she wanted or required to sink a putt.

Although stimp readings are normally available for green conditions, readings on the lay of a green are not available. Greens are normally laid out and maintained with immaculate care. Some greens are as flat as a pancake and horizontal. If the ball is putted directly towards the hole on such greens, i.e. along the direct putting path, the ball will normally roll to and in the cup without deviation, assuming the ball was hit with the right amount of energy. However, most greens are sloped. Thus on a sloped green, even if the green is flat, gravity will effect the ball as it rolls placing a downhill force on the ball and the path of the ball will curve downhill. When putting on such greens, the golfer must compensate for the slope. Thus the putting path is a curved path on such greens. Unfortunately or fortunately, depending on the golfer's point of view, skill and experience, many greens have several slopes running in different directions. Thus as the hole is moved day to day and the ball most always lies in a new position on the green during each round, the golfer must learn to read the slope[s] of a green and adjust his or her putting to accommodate for the slope. As a rule, when putting at distances of less than twenty five feet, the golfer will only have a single slope to contend with. With longer putting distances, and even with shorter putting distances on some greens, the golfer may have contend with two or more slopes between the ball and the hold. These are very difficult putts and a lot of luck is required to make the putt.

Most golfers after a little experience will attempt to read green slope[s]. Normally if the putt is a long one the golfer will walk the length of the distance between the ball or around the path, but observing golf etiquette-no walking on the path between the hole and another player's ball, and view the putting path both from the ball and the cup. The golfer will frequently squat down and attempt to read, or at least observe, the slope[s] of the green along the putting path. This can be difficult when the light is even, especially when the sun is overhead or the sky is clouded over, because shadowing is minimal. It is normally easier to read the slope[s] when the sun is low and the sun rays effect shadowing on the surface of green. As mentioned above, the professional caddie will have mapped out the slopes of the green before a tournament and an experience caddie at the courses that have them available, a rarity today, will have mentally mapped the slopes of the greens from experience on the course. However for the great majority of golfers in this world, the use of such caddie's is a rarity and the golfers must learn to read the slopes on their own. It even takes golfers who play the same course week end and week out at least six months to memorize the breaks on the course greens.

The object of the present invention is to provide a golfer with a device that can measure the slope of a particular area of a green. The training device can be used to confirm a golfer's slope reading of a particular area of the green.

A further object of the present invention is to provide a means for a golfer to read an indicated slope of a particular area of the green and then confirm the reading by measuring the slope with the device of the present invention.

It is a further object of the present invention to provide a device that can give the golfer an aim point for putting to give the indicated putting path so the golfer learns to determine the aim point upon determining the slope. Most golfers will not determine slope in degrees. Most golfers will develop an intuition about the slope and correlate the aim point to the slope. With experience, the golfer will correlate the speed or slowness of the surface and the conditions of the putting surface into his or her determination of the aim point.

A still further object of the present invention is provide a means for a golfer to read the slope of a particular area of the green, to determine the indicated putting path based on the slope reading, and then confirm the slope reading by measuring the slope and confirm the indicated putting path by attempting the putt along the indicated putting path.

A golfer can meet the present objectives by employing the device on a practice putting green to learn how to read green slopes, and/or to determine the indicated putting path, and then confirming slope readings with the device and/or confirming the indicated putting path by putting. A golfer can also use the device during a game assuming his or her partners don't object.

SUMMARY OF THE INVENTION

The present invention is directed to a putting training device indicating the slope of the device in increments with respect to its longitudinal axis when the device is resting on the surface of a putting green, the device comprising an elevated, elongated platform having opposing far ends, the longitudinal axis of the device intersecting the far end of the platform, the platform having a top that is parallel to the surface that the device is resting on, the center point of the platform intersecting the lateral axis; and a plurality of spirit levels secured to the platform, the spirit levels positioned parallel to the longitudinal axis, each spirit level positioned at a different horizontal angle with respect to the top of the platform, so that each spirit level indicating level at a different slope for the top of the platform when respect to its longitudinal axis.

The device can have at least one foot at each of its far ends to support the platform above the surface that the device rests on; each foot being of equal length. Preferably the legs support the platform high enough above the surface that the device rests on to permit the passage of a golf ball underneath the platform.

The top of the platform can be marked, such as with lines or bars parallel to the lateral axis of the device to act as a visual aid for putting the ball toward the device.

The present invention is directed to a putting training device indicating the slope of the device and aim points in increments with respect to its longitudinal axis when the device is resting on the surface of a putting green, the device comprising an elevated, elongated platform having opposing far ends supported above the ground by at least one foot at each of its far ends, each foot being of equal length, the longitudinal axis of the device intersecting the far end of the platform, the platform having a top that is parallel to the surface that the device is resting on, the center point of the platform intersecting the lateral axis; the spirit level positioned parallel to the longitudinal axis, a longitudinal spirit level secured to the platform and having opposing ends, the spirit level parallel to the longitudinal axis of the platform, the spirit level arched upward between its ends, its ends positioned approximate the far ends of the platform, the position of the bubble in the spirit level is different for different slopes of the top of the platform with respect to its longitudinal axis, and the bubble position is calibrated to indicate the aim point for the indicated putting path.

The device can have at least one foot at each of its far ends to support the platform above the surface that the device rests on; each foot being of equal length. Preferably the legs support the platform high enough above the surface that the device rests on to permit the passage of a golf ball underneath the platform.

The bottom side of the spirit level can be supported by a bridge or a plurality of posts secured to the top of the platform. The bridge or posts can be coded, such as color coded, to act as a visual aid for putting the ball toward the device. The top of the platform can be marked, such as with lines or bars parallel to the lateral axis of the device to act as a visual aid for putting the ball toward the device.

And still another embodiment of the present invention is directed to a putting training method comprising placing a putting training device on a putting surface on the direct putting path between a golf ball and the hole in the surface, the lateral axis of the training device being parallel to the direct putting path and the center point of the device positioned approximately above the direct putting path, the device comprising an elevated, elongated platform having opposing far ends, the longitudinal axis of the device intersecting the far end of the platform, the platform having a top that is parallel to the surface that the device is resting on, the center point of the platform intersecting the lateral axis; and a plurality of spirit levels secured to the platform, the spirit levels positioned parallel to the longitudinal axis, each spirit level positioned at a different horizontal angle with respect to the top of the platform, so that each spirit level indicating level at a different slope for the top of the platform when respect to its longitudinal axis, the slope of the surface of the putting green on which the device rests indicated by the spirit level registering level and the aim point for the indicated putting path between the golf ball and the putting hole is directly in line with the vertical axis intersecting the spirit level registering level.

The method can also include the step of confirming the indicated putting path by putting the ball to a point on the putting surface vertically aligned with the bubble registering level in the spirit level with sufficient energy so that the ball will roll to and into the cup if the indicated putting path is the correct path from the ball to the cup.

A putting training method comprising placing a putting training device on direct putting path between putting hole on a putting surface and a golf ball, the device comprising an elevated, elongated platform having opposing far ends supported above the ground by at least one foot at each of its far ends, each foot being of equal length, the longitudinal axis of the device intersecting the far end of the platform, the platform having a top that is parallel to the surface that the device is resting on, the center point of the platform intersecting the lateral axis; the spirit level positioned parallel to the longitudinal axis, a longitudinal spirit level secured to the platform and having opposing ends, the spirit level parallel to the longitudinal axis of the platform, the spirit level arched upward between its ends, its ends positioned approximate the far ends of the platform, the position of the bubble in the spirit level different for different slopes of the top of the platform with respect to its longitudinal axis, the slope of the surface of the putting green on which the device rests indicated by the position of the bubble in the spirit level and the aim point for the indicated putting path between the golf ball and the golf hole directly in line with a vertical axis intersecting the bubble in the spirit level.

The method can also include the step of confirming the indicated putting path by putting the ball to a point on the putting surface vertically aligned with the bubble in the spirit level with sufficient energy so that the ball will roll to and into the cup if the indicated putting path is the correct path from the ball to the cup.

DESCRIPTION OF THE INVENTION

Figure 1:
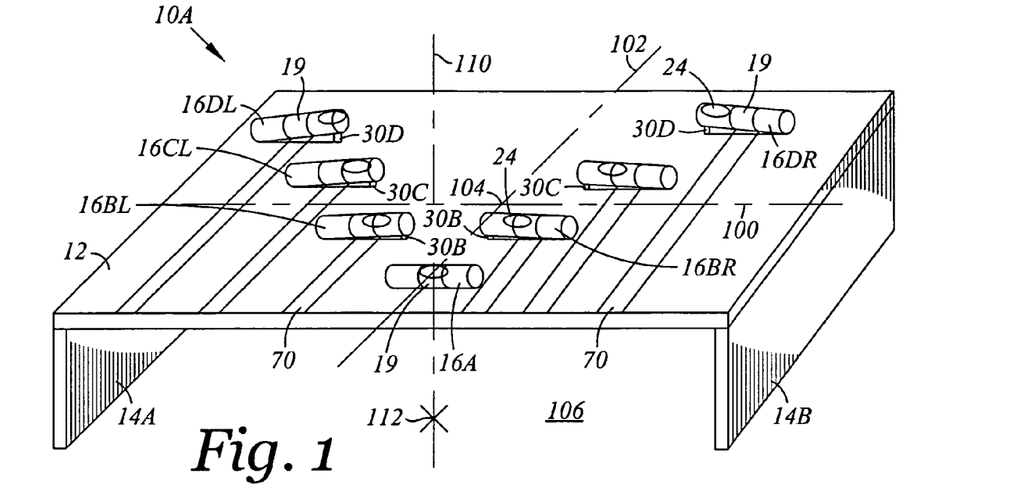
FIG. 1 is a top front perspective view of the putting training device of the present invention.

Referring to FIG. 1, the putting training device 10A comprises a planar platform 12 having feet 14A and 14B secured to its longitudinal ends, and a plurality of spirit levels, also called bubble levels, 16DL, 16CL, 16BL, 16A, 16BR, 16CR and 16DR secured to the top of the platform. The feet 14A and 14B are of equal height so that the platform is parallel to the surface 106 that the base of the feet rest on. The device has a longitudinal axis 100 running from one end to the other end of the platform, a lateral axis 102 running from the front side to the back side of the platform and a center point 104 where the two axes intersect. The spirit levels run parallel to the longitudinal axis. Spirit levels have been known for at least a century and are normally comprise a transparent tube 18 containing a fluid 22 sealed into the tube by sealed ends 18. The tube contains a fluid 22 with a gas bubble 24 with indicates true level with respect to the Earth and if the tube is calibrated it can give slope readings. Each spirit level is set at a different offset angle with respect to the top of the platform using spacers or wedges 30B, 30C and 30D. Most slopes on putting surfaces or greens do not exceed five degrees when the ball is at rest, although there are points on some putting surfaces that have slopes exceeding seven degrees. On most putting surfaces having a slope exceeding six to eight degrees, the ball will not rest on the slope because of the steepness. Virtually all golfers have seen their ball land within two to four feet of the cup and merrily roll down the slope of the putting surface some ten to twenty feet from the cup as they hopelessly look on. Thus conveniently the offset angles of the spirit levels 16DL, 16CL, 16BL, 16A, 16BR, 16CR and 16DR are between zero degrees and about six degrees. Thus spirit levels 16BL and 16BR can be offset two degrees, spirit levels 16CL and 16CR can be offset four degrees, and spirit levels 16DL and 16DR can be offset six degrees. Conveniently the center spirit level 16A is parallel to the top of the platform and thus parallel to surface 106 on which the device rests. If the surface is level to the earth, the spirit level 16A registers level. If the device is positioned on a putting surface having a slope of two degrees with respect to its longitudinal axis 100, the spirit level 16BL or 16BR will register level depending on whether the slope is angled upward or runs upward to the left or right. If the slope of the putting surface is four degrees, spirit levels 16CL or 16CR will register level depending on which way the slope runs up to. If the slope of the putting surface is six degrees, spirit levels 16DL or 16DR will register level depending on which way the slope runs up to. If the slope is between the offset angle of two spirit levels, the spirit levels with offset angles bracketing the slope will be the closest registering level. For example if the slope of the putting surface is three degrees running up to the left, the bubble in spirit level 16BL will be positioned to the left of the marked level zone 19 and the bubble in spirit level 16CL will be positioned to the right of the marked level zone.

The device not only can be used to determine the slope of the putting surface, it can also be used to give an aim point 112 for the indicated putting path described in more detail infra. The aim point 112 is intersected by a vertical line 110 which also intersects the level zone 19 of the spirit level registering level, respectively. the platform. To aid the golfer in determining the position of the aim point, the top of the platform 12 can be marked with lines, stripes, color bars, or the like that run at least from the front side of the device to a point underneath the level zone 19 of the spirit levels.

Figure 2:
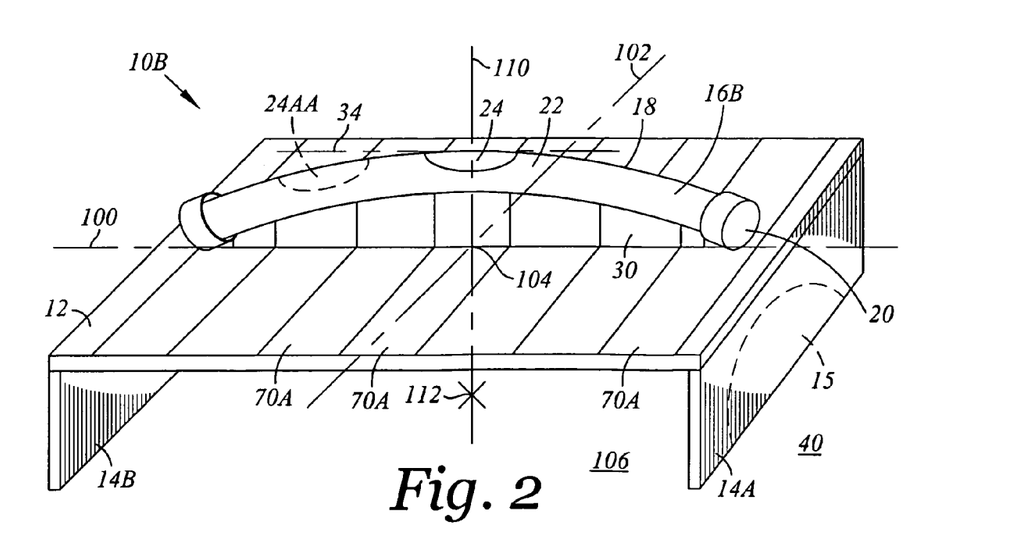
FIG. 2 is a top front perspective view of another embodiment of the putting training device of the present invention.
Figure 3:
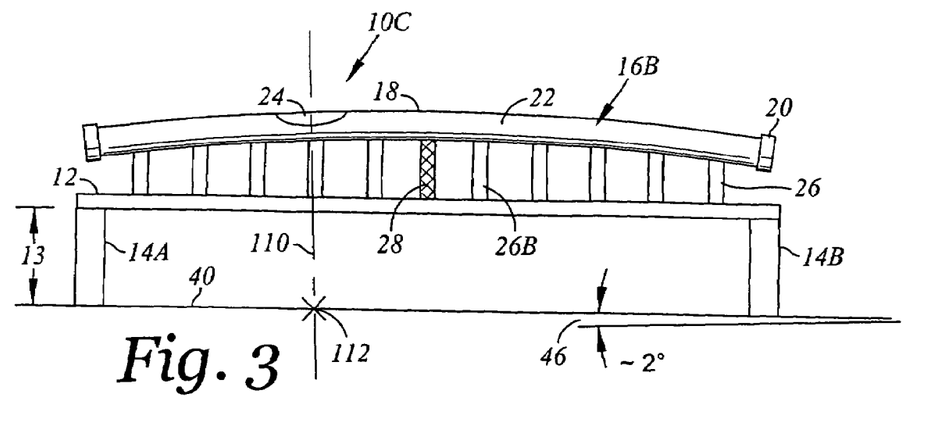
FIG. 3 is a plan front view of another embodiment of the putting training device of the present invention.

Referring to FIGS. 2 and 3, the putting training device 10B and 10C comprises a planar platform 12 having feet 14A and 14B secured to its longitudinal ends, and a curved or arched spirit level 16B on support or bridge 30 secured to the top of the platform, or supported by a plurality of posts 26 as shown in FIG. 3. The feet 14A and 14B are of equal height so that the platform is parallel to the surface 106 that the base of the feet rest on. The device has a longitudinal axis 100 running from one end to the other end of the platform, a lateral axis 102 running from the front side to the back side of the platform and a center point 104 where the two axes intersect (not shown in FIG. 3). The spirit level is in a plane that is parallel to a plane of the longitudinal axis. The spirit level has a transparent tube 18 containing a liquid 22 and a gas bubble 24. The ends of the tube are sealed off, such as with caps 20. Preferably the liquid 22 in the spirit level 16B is colored to have a high contrast with respect to the gas bubble to aid the golfer in reading where the position of the bubble 24 and the aim point 112, described below. The tube contains a gas bubble 24 which floats on top of the fluid 22. The bubble indicates true level with respect to the Earth and if the tube is calibrated it can give slope readings. The curve of the spirit level is chosen to read a slope of up to seven degrees; although it can be designed to cover less than or more than seven degrees. When the device is placed on a level surface, the bubble 24 goes to the high point of the tube arch, normally located at the center portion of the tube. If the device is placed on a slope running up to the left along the longitudinal axis, the bubble 24 moves to a position to the left, shown in phantom 24AA, always seeking the highest level in the tube (See FIG. 2). If the slope ran up to the right, the bubble would move to the right in the tube. A tangent 34 to the bubble 24 is always parallel to true level with respect to the Earth. The vertical axes 110 intersecting the bubble 24 is perpendicular to the tangent 34 and theoretically would run to the center of the Earth.

The device not only can be used to determine the slope of the surface of the green, it can also be used to give an aim point 112 for the indicated putting path described in more detail infra. The aim point 112 is intersected by the vertical line 110 which intersects the bubble 24 and is perpendicular to the tangent 34 (FIG. 2). To aid the golfer in determining the position of the aim point, the top of the platform 12 can be marked with lines, stripes 70A, or the like, that run at least from the front side of the device to a point underneath the tube 18. The stripes can also run from the front side to the back side, and/or up the support 30 as shown in FIG. 2.

Preferably the stripes at least alternate colors, such as black, white, black, etc., or red, blue, red, blue, etc. to aid the golfer in selecting the right stripe which is intersected by vertical axis 110 which covers the aim point 112. Preferably the mid point of the device is marked, such as with a color marker 28 (See FIG. 3).

Preferably the devices 10A, 10B and 10C are supported high enough above the surface of the green to permit the golf ball to roll to the aim point 112 and underneath the platform to the cup. Preferably the height of the platform is a quarter inch to a half inch greater than the diameter of the golf ball to permit the ball to pass underneath the platform without touching the platform if the ball jumps across the surface as can sometimes happen.

Figure 4:
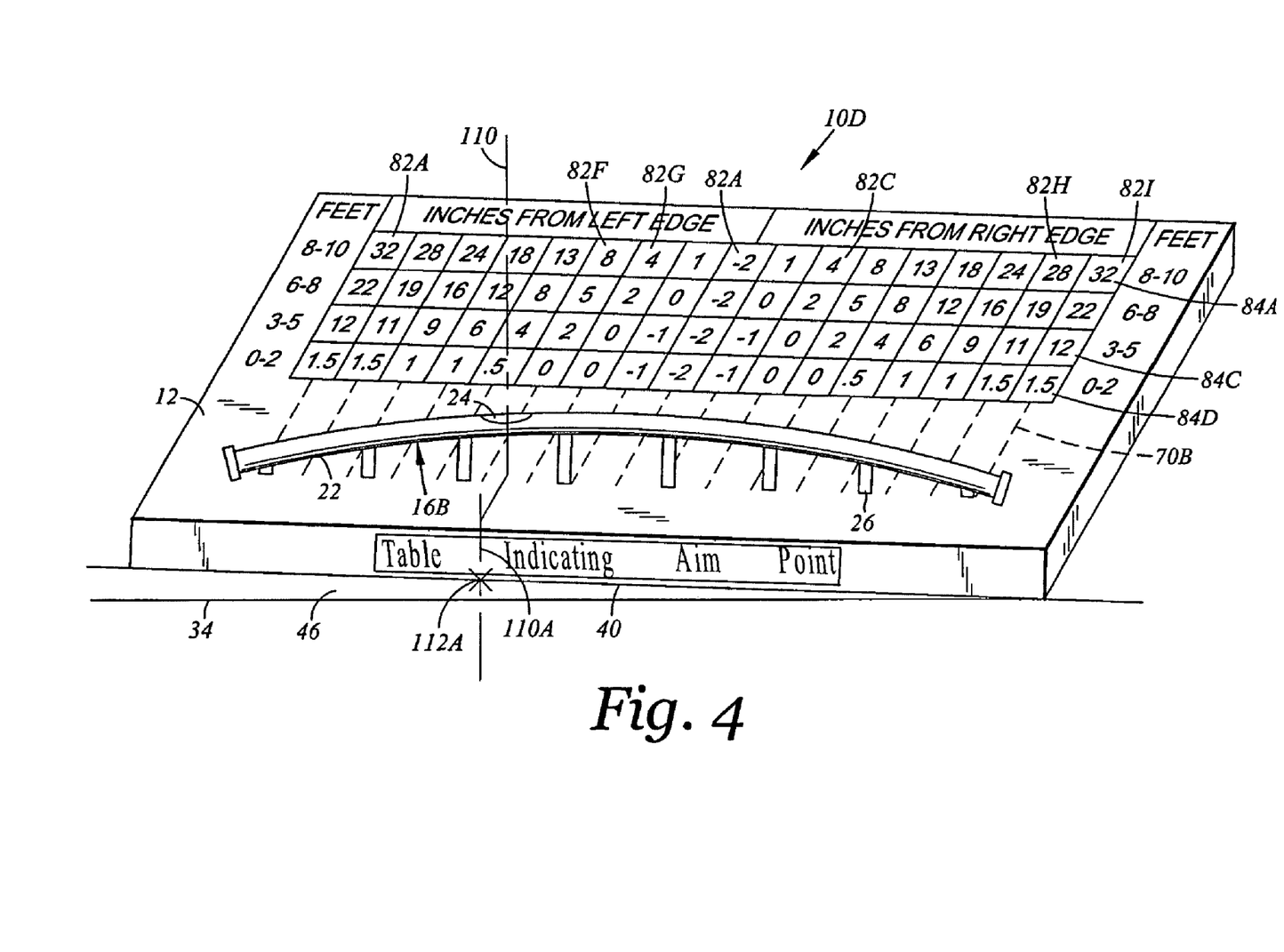
FIG. 4 is a top front perspective view of another embodiment of the putting training device of the present invention.

Referring to FIG. 4, the putting training device 10D has a platform 12 on which is mounted a spirit level 16B mounted on support posts 26. The spirit level is in a plane that is parallel to a plane of the longitudinal axis. The top of the platform has a table which is tied into the position of the bubble 24 of the spirit level. The table has four rows 84A through 84D which give the aim point for the cup for specified distance ranges of the ball from the cup. The table has 17 rows which gives the distance of the aim point from the cup depending upon the slope being measured. For example, if the slope of the green surface is two degrees and the distance of the ball from the cup is seven feet, the golfer should putt the ball to an aim point five inches from the left edge 51L of the cup. The table can also include a degree of slope scale.

Figures 5, 6:
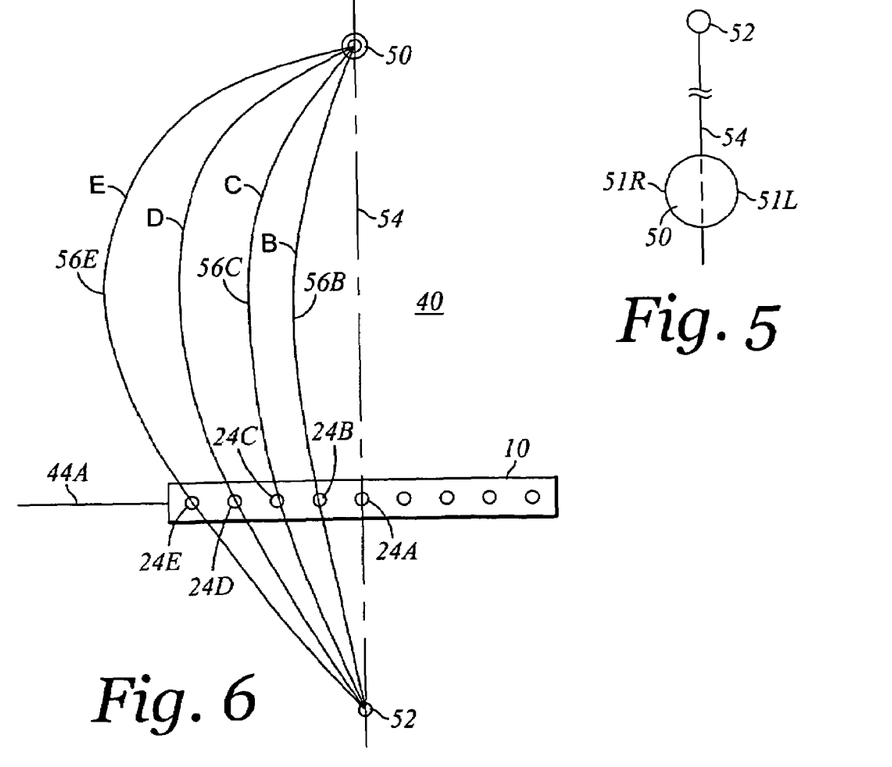
FIG. 5 is a telescoped top view of a putting green showing the ball and the cup.
FIG. 6 is a top view of a putting green showing indicated putting paths between the ball and the cup.

Referring to FIG. 5, on flat green level with the Earth, i.e. a green surface without a slope between the ball 52 and the cup 50, the ball can be putted to the cup along the direct putting path 54. For purposes of the description herein, the right side 51R of the cup 50 and the left side 51L of the cup will be demarked as seen from the position of the ball. Thus as the ball veers to the left and passes the cup, it passes the left side 51R of the cup. For a ball that veers to the right and passes the cup, it passes the right side of the cup.

Referring to FIG. 6, The putting training devices 10A, 10B and 10C are normally placed from two to five feet from the ball for putts between about five and fifteen feet. Interestingly, it appears that shots of fifteen feet or less only encounter a single slope. There are exceptions, but they are relatively uncommon. The lateral axis 102 of the devices 10A, 10B and 10C are placed over the direct putting path 54 between the ball 52 and the cup 50. The alignment of the lateral axis and the direct putting path is by eyeball, that is, approximate. The slope to be measured does not necessarily run perpendicular to the direct putting path; the slope or break can run at an angle to the direct putting path. The golfer notes the aim point on the device. The golfer then putts the ball to the indicated aiming point 70 determined by the position of the bubble in the spirit level. The golfer may take several measurements to determine the slope, usually one at the hole and one a few feet from the ball. With experience and practice the golfer will be able to interpolate an aim point from two or more readings and position the device appropriately. The steeper the slope the greater the deviation of the indicated putting path 56 from the direct putting path 54. As the slope increases the bubble of the spirit level[s] and thus the aim point moves farther away from the normal level marker of the spirit level[s].

In FIG. 4, the indicated putting path 112A is intersected by vertical axis 110A which is parallel to vertical axis 110 that intersects the bubble in spirit level 16 of device 10D. The vertical axes 110 and 110 A fall between rows 82F and 82G of the table on the device 10D. Thus the aiming point 112A will be an average of the value in row 82F and the value in row 82G. For example if the ball is six to eight feet from the cup, the aiming point will be five inches from the left edge 51L of the cup 50. This device of FIG. 4 is placed at the hole and is removed after the golfer sees the indicated putting aim point as referenced to the cup or hole because the device blocks the indicated putting path.

Referring back to FIG. 6, The bubble in position 24A is the normal level marker position, i.e., the position of a bubble in a spirit level indicating the level is parallel to the true level with Earth. The bubble is in position 24A when the device 10A, 10B or 10C is resting on a surface where there is no slope. The putting path for a ball when the bubble is in position 24A is the direct putting path 54. At bubble position 24B, the device is resting on a surface having a slope running up to the left. The indicated putting path 56B is path B. At bubble position 24C, the device is resting on a surface having a slope running up to the left which is greater in slope than the slope indicated by bubble position 24B. The indicated putting path 56C is path C which deviates further from the direct putting path 54 than the putting path B. In FIG. 6 the greatest slope moves the bubble to position 24E and gives an indicated putting path 56E which deviates more from the direct putting path 54 than paths B, C and D.

The device 10 is positioned on breaks or slopes of a putting surface and the slope at the that position can be determined from the spirit level that registers level on device 10A or it can be determined from the position of the bubble in the spirit level 16B of the devices 10B and 10C.

Figure 7:
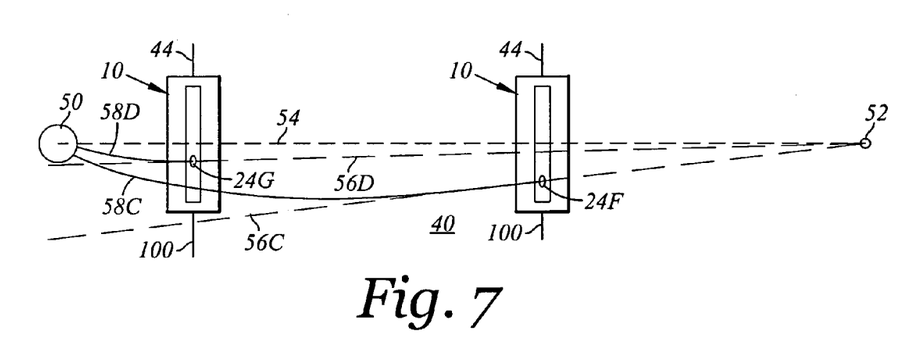
FIG. 7 is a top view of a putting green showing indicated putting paths between the ball and the cup for two different breaks.

Referring to FIG. 7, this figure illustrates the use of the device of the present invention on a putting surface for two cases. In the first case, the slope is near the ball 52. The longitudinal axis 100 of the device is aligned with the slope and the lateral axis 102 is positioned over the direct putting path 54. The bubble 24F of the device's spirit level 16 is over the aim point (not shown). The golfer aims towards the bubble which is on a vertical axis with the aim point. The ball if hit true with sufficient energy to roll to the cup will follow the indicated putting path 56C and then curve to the actual putting path 58C by the effect of the slope and gravity to the cup 50. In the second case, the putting surface is relatively true to the true level of the Earth but has a slight break or slope near the cup. The slope is near the cup 50. The longitudinal axis 100 of the device is aligned with the slope and the lateral axis 102 is positioned over the direct putting path 54. The bubble 24G of the device's spirit level 16 is over the aim point (not shown). The golfer aims towards the bubble which is on a vertical axis with the aim point. The ball if hit true with sufficient energy to roll to the cup will follow the indicated putting path 56D and then curve to the actual putting path 58D by the effect of the slope and gravity to the cup 50.

Figure 8:
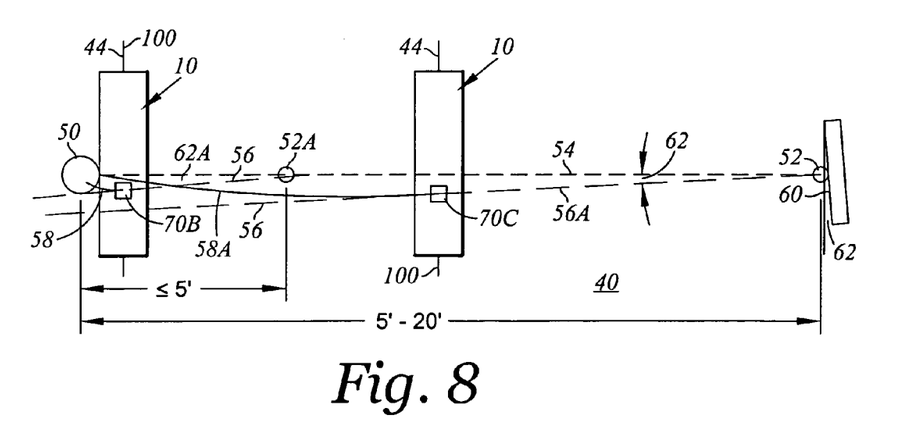
FIG. 8 is a top view of a putting green showing indicated putting paths for different lies of the ball with respect to the cup.

Referring to FIG. 8, this figure illustrates the use of the device of the present invention on a putting surface for two additional cases. In the first case, the slope is midway between the cup 50 and the ball 52. The longitudinal axis 100 of the device is aligned with the slope and the lateral axis 102 (FIGS. 1 and 2) is positioned over the direct putting path 54. The bubble (not shown) of the device's spirit level (not shown) is over the aim point (not shown). The golfer aims the putt towards the bubble which is on a vertical axis with the aim point. The ball, if hit true with sufficient energy to roll to the cup, will follow the indicated putting path 56A and then curve to the actual putting path 58A by the effect of the slope and gravity to the cup 50. The angle 62 between the direct putting path 54 and the indicated putting path 56A is equal to the angle 62 between a perpendicular to the direct putting path 54 and the face 60 of the putter. When the putter addresses the ball at angle 62, the putter face 60 is perpendicular to the indicated putting path 56A. This is the correct way for the putter to address the ball in putting. In the second case, the green surface is relatively true to the true level of the Earth but has a significant break or slope very near the cup. The lie of the ball 52A is near the cup. The lateral axis 102 (FIGS. 1 and 2) is positioned over the direct putting path 54. The bubble (not shown) of the device's spirit level (not shown) is over the aim point (not shown). The golfer aims towards the bubble which is on a vertical axis with the aim point as described above. The ball if hit true with sufficient energy to roll to the cup will follow the indicated putting path 56 and then curve to the actual putting path 58 by the effect of the significant slope and gravity to the cup 50.

In most situations, the device (10A, 10B, 10C, and 10D) of the present invention will be positioned between the ball and the cup. However, there will be situations, more frequently with short putts, where the device will be positioned over the cup or behind the cup. Devices 10A, 10B, and 10C are conveniently left on the putting surface during the putt. Device 10D has to be removed from the putting surface unless it is positioned behind the cup. If device 10D is positioned between the ball and cup or over the cup, it can block the putt.

As illustrated above, the present device is used to identify the proper aim point when putting a golf ball on sloped surfaces. Although the device measures the slope, the principal purpose of the device is to teach the golfer the proper aim point for the indicated putting path on a putting surface. With use, the golfer will extend the aim point from the device to a point at the cup, normally to one side of the cup depending on the slope of the surface between the ball and the cup. The golfer can train him or herself to identify the proper aim point when affected by sloped putting surfaces. Obviously depending upon the lie of the ball on the putting surface and the position of the cup on a given day, the aim point will vary from hole to hole and lie to lie. As the golfer learns to identify proper aim points, he or she will also learn how to alter the putting path to compensate for the slope. Initially the golf can use the devices shown in FIGS. 1, 2 and 3. This permits the golfer to leave the device in place during the putt. The golfer can also use the device of FIG. 4 which will give the slope and give an aiming point for the indicated putting path as a point set off from one side of the cup by a specific distance, such as in inches, centimeters, or the like. This device must be removed from the indicated putting path before the putt since it lies directly on the putting surface (i.e. unless it is placed behind or to the proper side of the hole so it will not interfere with the roll of the ball).

What is claimed is:

1. A putting training device indicating the slope of the device in increments with respect to its longitudinal axis when the device is resting on a putting surface, the device comprising an elongated platform having two longitudinal sides and two opposing far ends, the longitudinal axis of the device intersecting the far ends of the platform, the platform having a top that is parallel to the surface that the device is resting on, the center point of the platform at the intersection of the longitudinal and lateral axes; and a single spirit level having a curvature and coupled to the platform, wherein the spirit level is in a plane that is parallel to a plane of the longitudinal axis, wherein the curvature of the spirit level is such that the spirit level indicates true level at a different slope of the platform with respect to its longitudinal axis, and wherein the top of the platform is marked with a table indicating the aim point for the indicated putting path as a point at an indicated distance from a side of the cup by reference to the spirit level indicating true level.

2. The putting training device according to claim 1 wherein the top of the platform is marked to indicate the aim point for the indicated putting path by reference to the spirit level indicating true level.

3. The putting training device according to claim 1 wherein the top of the platform and one longitudinal side are marked with a table indicating the aim point for the indicated putting path as a point at an indicated distance from a side of the cup by reference to the spirit level indicating true level.

4. The putting device according to claim 1 wherein the device has a scale means to indicate the proper aim point for various putting surface slopes with respect to the longitudinal axis of the device.

5. A putting training device indicating the slope of the device with respect to its longitudinal axis when resting on the surface of a putting surface, the device comprising an elongated platform having two longitudinal sides and two opposing far ends, the longitudinal axis of the device intersecting the far ends of the platform, the platform having a lateral axis, the platform having a top that is parallel to the surface that the device is resting on, the center point of the platform at the intersection of the longitudinal and lateral axes; a spirit level secured to the top of the platform and in a plane that is parallel to a plane of the longitudinal axis, the bubble in the spirit level indicating the slope of the device with respect to its longitudinal axis, and wherein the top of the platform is marked with a table indicating the aim point for the indicated putting path as a point at an indicated distance from a side of the cup by reference to the position of the bubble in the spirit level.

6. The device according to claim 5 wherein the bubble of the spirit level is directly above an aim point for the indicated putting path.

7. The putting training device according to claim 5 wherein the top of the platform is marked to indicate the aim point for the indicated putting path by reference to the position of the bubble in the spirit level.

8. The putting device according to claim 5 wherein the top and one longitudinal side of the platform are marked to indicate the aim point for the indicated putting path by reference to the position of the bubble in the spirit level.

9. The putting device according to claim 5 wherein the device has a scale to indicate degrees of slope by reference to the position of the bubble in the spirit level.

* * * * *